United States Patent [19]
Burgdorf

[11] 3,756,660
[45] Sept. 4, 1973

[54] MULTI-CIRCUIT BRAKE SYSTEM

[75] Inventor: Jochen Burgdorf, Odenwaldring, Germany

[73] Assignee: ITT Industries, Inc., New York, N.Y.

[22] Filed: Aug. 12, 1971

[21] Appl. No.: 171,579

[52] U.S. Cl............................. 303/6 R, 60/54.5 E
[51] Int. Cl............................................ B60t 13/12
[58] Field of Search .............. 188/345, 106 P, 354, 188/356–358; 303/6 R, 2, 4, 13, 25; 60/54.5 E, 54.5 P, 54.6 P

[56] References Cited
UNITED STATES PATENTS
3,550,377  12/1970  Mochinzuki et al. ............... 188/345

Primary Examiner—Milton Buchler
Assistant Examiner—E. R. Kazenske
Attorney—C. Cornell Remsen, Jr.

[57] ABSTRACT

A two brake circuit pedal master cylinder provides brake fluid pressure for the control valve of a vacuum brake booster and two intermediate master cylinders each coupled to the wheel cylinders of a different brake circuit. A single booster cylinder operated by the brake booster also provides brake fluid pressure for the two intermediate master cylinders. The two intermediate master cylinders are integral in construction. A pair of blind bores are formed in a housing parallel to each other and the longitudinal axis of the housing. Each bore is part of a different intermediate master cylinder, divided longitudinally into two chambers and filled with brake fluid. The first chamber of each bore includes a valve piston operated on hydraulically by the brake fluid pressure from the pedal master cylinder to activate the brake circuit associated with that particular intermediate master cylinder. The second chamber of each bore includes a secondary piston carrying a locking member mechanically operable on the associated valve piston when the booster cylinder applies brake fluid pressure to the secondary piston. The cylindrical member forming the second chamber and carrying the secondary piston is threaded into its associated bore.

10 Claims, 4 Drawing Figures

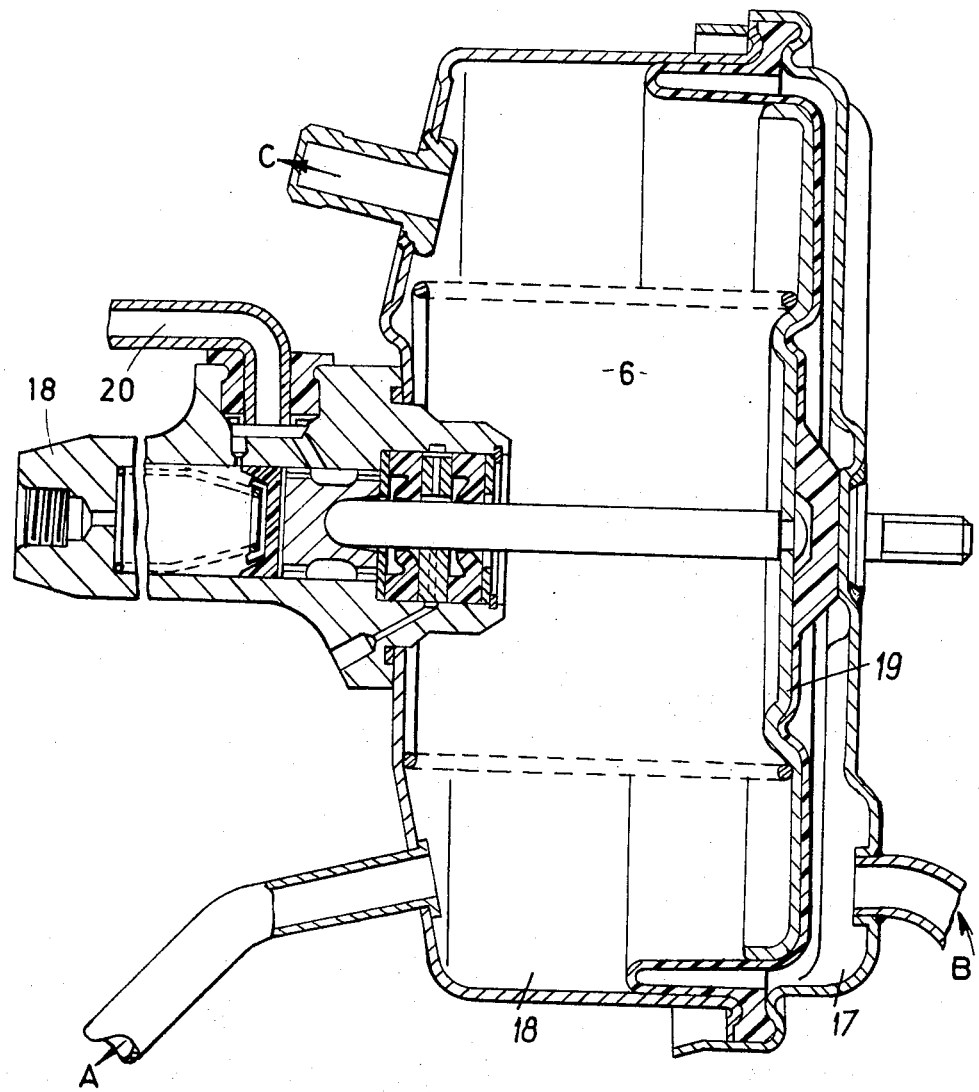

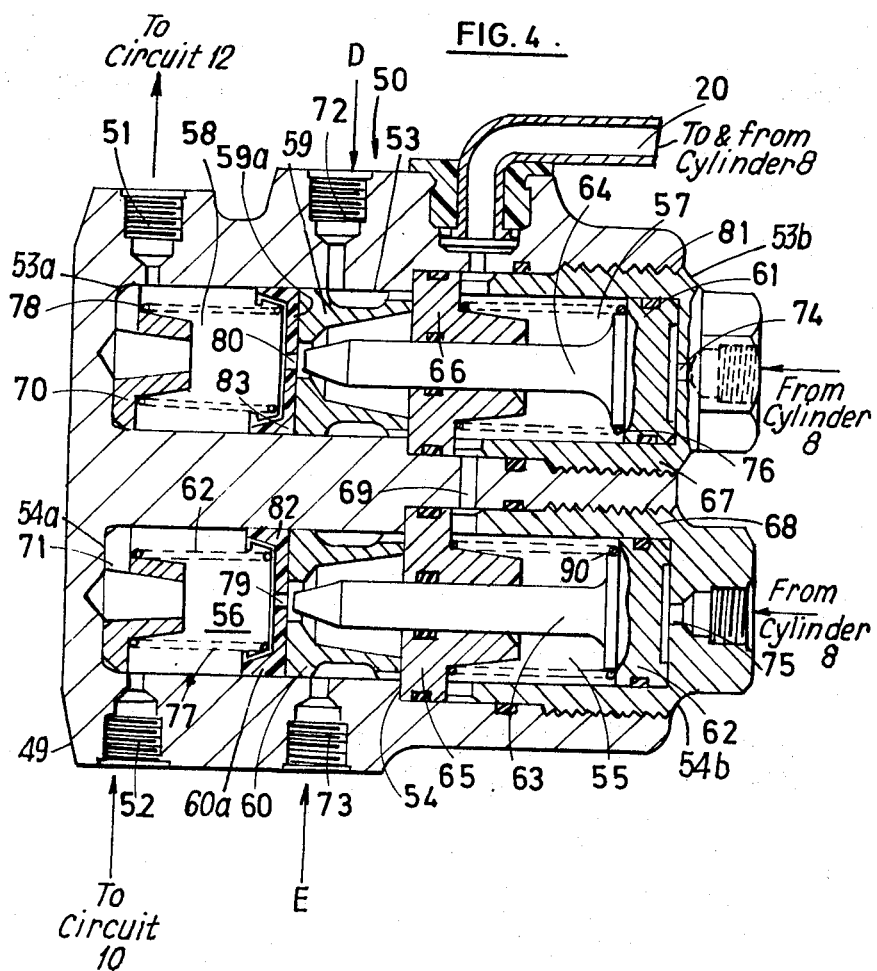

MULTI-CIRCUIT BRAKE SYSTEM

BACKGROUND OF THE INVENTION

The invention relates to a brake system, and more particularly to a multi-circuit brake system, especially for vehicles.

Multi-circuit brake systems have the object of providing the driver with a uniform brake feel and at the same time a brake booster for supplying the actual force for the actuation of the brake cylinders. Furthermore, such brake systems prevent, upon failure of one of the brake circuits, a stroke loss in the control and booster units in addition to the stroke loss occurring in the master cylinder.

From British Pat. No. 837,576, it is known to integrate the controller, the brake booster and the tandem pressure cylinder, i.e., to fuse these elements into integral constructional unit. In this embodiment, only the pedal master cylinder is separate.

The subject matter of British Pat. No. 1,108,562 also discloses a two-circuit brake system in FIG. 5. In this case the pedal master cylinder and the control devices are separate from each other. The brake booster, however, is provided in duplicate, i.e., one for each brake circuit.

The latter embodiment has the disadvantage that two or even more brake boosters are expensive and bulky. Furthermore, they have to be aligned with respect of each other, i.e., they must be adjusted in order to achieve a uniform brake effect.

In British Pat. No. 837,576, the disadvantage of two brake boosters and the danger of the different brake pressures are overcome by providing a two-circuit booster cylinder in a tandem arrangement instead of a one-circuit booster cylinder directly at the brake booster. Because of the large constructional length of this two-circuit tandem arrangement booster cylinder, this system, however, has never been built in large quantities. A further disadvantage of this embodiment lies in the fact that this brake system cannot be extended to three or more brake circuits.

SUMMARY OF THE INVENTION

An object of the present invention is to provide a multi-circuit brake system which effects a uniform brake pressure with only one brake booster, said multi-circuit brake system being compactly designed according to the integral unit-constricted system, being extendable to more than two brake circuits and allowing the optimizing of the hysterisis of the controlled pressure-generating circuit.

According to the invention this task is solved by providing at least two intermediate master cylinders which are connected in parallel and each of which are provided with two longitudinally disposed chambers lying one behind the other and filled with pressure fluid, each of the intermediate master cylinders furthermore being provided with a valve piston which is displaceable in one of the chambers and held by means of a spring and with a secondary piston displaceable in the other of the chambers. The valve piston is disposed at the consumer circuit and is displaceable hydraulically by means of the pedal master cylinder, on the one hand, and mechanically by means of a valve locking member of the secondary piston, on the other hand, the valve locking member passing through the wall which is separating the two chambers.

For the purpose of volume compensation for the compensation brake fluid reservoir of the booster and for the purpose of good protection against corrosion, the chamber of the intermediate master cylinders, formed by the secondary pistons and the separating walls, are in communication with the non-pressurized chamber of the booster cylinder at the brake booster by means of a connecting line and also with each other by means of intermediate ducts in the housing containing the bores in which the intermediate master cylinders are formed.

In order to achieve a maximum adaptation of the control valve at the brake booster and, thus, an optimizing of the hysterisis of the controlled pressure-generating circuit, the effective surfaces of the valve piston and the secondary piston may be different in size, the intermediate master cylinders possibly being stepped cylinders. The ratio of the boosted brake pressure depends on how the ratio of the secondary piston surface to the valve piston surface is selected.

According to another embodiment, a cylindrical part is disposed at the front wall of the chamber, lying at the consumer circuit, for the guiding and supporting of the spring and as a pressure medium bleeding device. The secondary pistons are screwed into the intermediate master cylinders, thus, an easy exchange or repair being safeguarded.

The advantages of the invention particularly consist in that the parallel connected intermediate master cylinders work according to a simple and proved system and that these systems can be extended to any number of brake circuits.

Due to their hydraulic application the intermediate master cylinders may be allocated anywhere in the available space of the vehicle. Thereby the brake booster itself will not be extremely long in its dimensions. By changing the ratio of the secondary piston surface to the valve piston surface of the intermediate master cylinders, the ratio of the servo action is indefinitely variable within certain limits, i.e., the optimizing of the hysterisis of the controlled pressure-generating circuit is safeguarded. The pressure-generating circuit relates to the pressure surface and the effective surface ratios between the piston of the control valve and the piston of the brake booster which allow a maximum control and servo action only in the case of a certain defined ratio. In the two-circuit brake systems known up to now the ratio of the servo action was varied by extending or reducing the effective surfaces of the piston in the control valve, the fact of a resultant reduced utilization or of a reduced controllability, respectively, of the control valve being tolerated.

A feature of the present invention is the provision of a multi-circuit brake system comprising: a pedal master cylinder capable of supplying brake fluid to at least two brake fluid lines; a vacuum brake booster; a control valve connected to each of the two lines and the booster in a control relationship therewith; a single output booster cylinder connected in operative relationship with the booster; at least two intermediate master cylinders, each of the intermediate master cylinders connected in common with the booster cylinder and to a different one of the two lines, both of the intermediate master cylinders being subjected to brake fluids pressure from the pedal master cylinder and the booster cylinder when the brake booster is operative and being subjected to brake fluid pressure from only the pedal master cylinder when the brake booster is inoperative; and at least two brake circuits each connected to and under control of a different one of the intermediate master cylinders.

Another feature of the present invention is the provision of the two intermediate master cylinders include a housing having a longitudinal axis, two bores in the housing disposed in spaced parallel relationship to each other and the longitudinal axis, each of the bores having an open end connected to the booster cylinder and a closed end, a valve piston disposed in each of the bores and displaceable longitudinally thereon, a spring engaging each of the valve pistons and the closed end of the associated one of the bores, a secondary piston having a locking member disposed in each of the bores and displaceable longitudinally therein, each of the locking members extending from one surface of the associated one of the secondary piston toward the associated one of the valve pistons, each of the locking members having an end engaging the associated one of the valve pistons for movement thereof when the brake booster is operative, the other surface of each of the secondary pistons being disposed adjacent the open end of the associated one of the bores, and a member disposed transversely of each of said bores to slideably receive the associated one of the locking members and cooperating to form two chambers in series relation with respect to each other in the associated one of the bores, each of the chambers being filled with brake fluid, the first of the chambers in each of the bores is formed by the closed end of the associated one of the bores and the associated one of the members and is connected to a different one of the brake circuits and a different one of the brake fluid lines and contains the associated one of the valve pistons, the second of the chambers in each of the bores is formed by the associated one of the members and the secondary piston, each of the valve pistons being hydraulically displaced by means of the pedal master cylinder and being mechanically displaced by the associated one of the locking members when the brake booster is operative.

BRIEF DESCRIPTION OF THE DRAWING

Above-mentioned and other features and objects of this invention will become more apparent by reference to the following description taken in conjunction with the accompanying drawing in which:

FIG. 3 is a cross-sectional view of the brake booster of FIG. 1; and

FIG. 4 is a cross-sectional view of the intermediate master cylinders of FIG. 1.

DESCRIPTION OF THE PREFERRED EMBODIMENT

Figure 1:
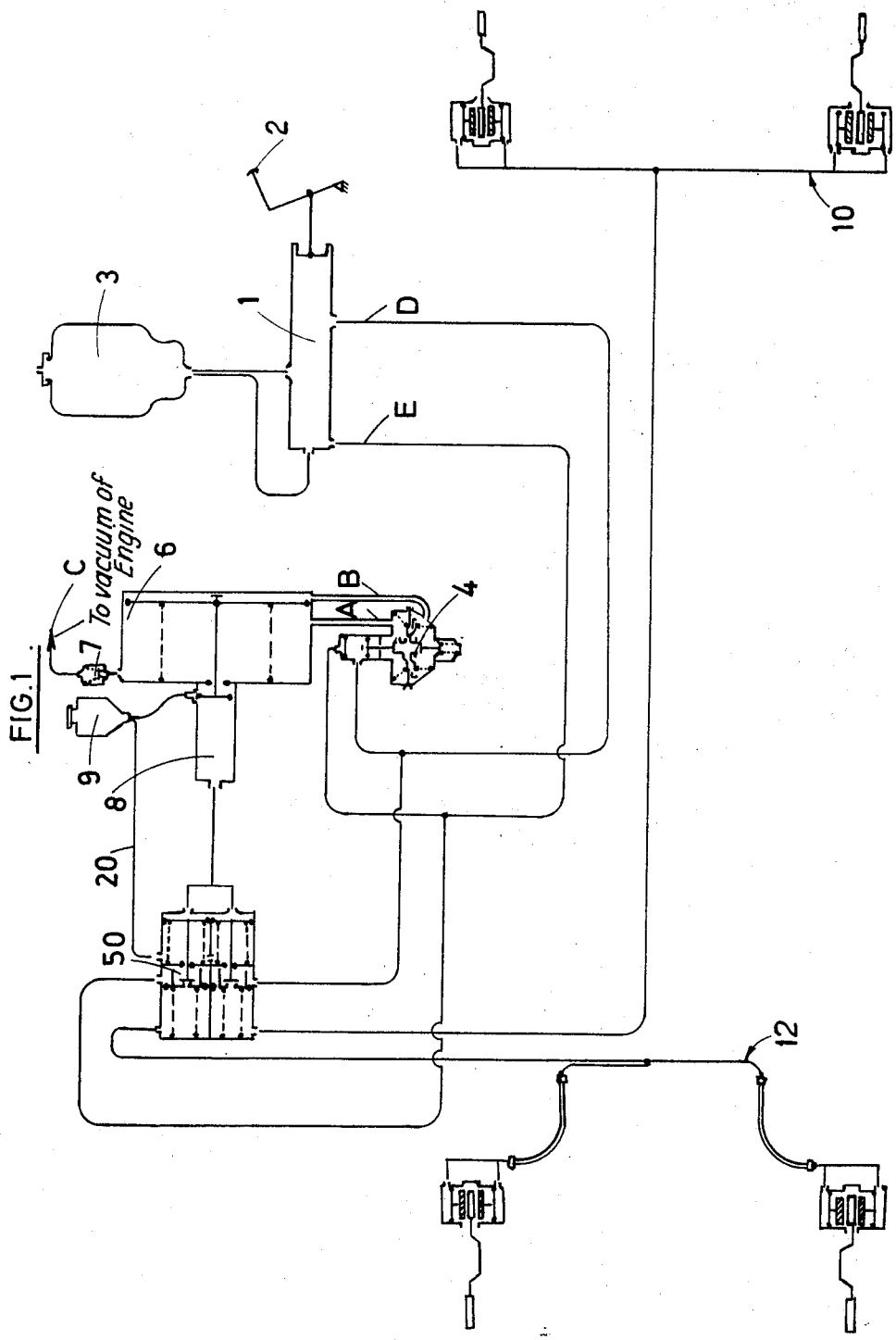
FIG. 1 illustrates schematically the multi-circuit brake system in accordance with the principles of the present invention.

In FIG. 1 a two-circuit brake system is illustrated where the control valve 4 and the intermediate master cylinders 50 respectively are actuated by pedal master cylinder 1 by means of pedal 2 via the brake fluid feeder lines D and E. Pedal master cylinder 1 is provided with brake fluid by brake fluid reservoir 3 via feeder lines. Control valve 4 is connected with vacuum brake booster 6 via the two feeder lines A and B. In the vacuum part of booster 6 a connection line C leading to the suction or vacuum manifold of the vehicle engine is provided. Said connection line C contains non-return valve 7. The one-circuit booster cylinder 8 actuated by the vacuum piston of brake power booster 6 supplies intermediate master cylinders 50 with pressure fluid. Intermediate master cylinders 50 are connected with booster cylinder 8 via connection line 20. Brake fluid reservoir 9 provides these two parts with brake fluid. Each of intermediate master cylinders 50 are also elements of a different one of the two brake circuits 10 and 12 and act to activate the wheel brake cylinders contained in circuits 10 and 12.

Referring to FIG. 4, intermediate master cylinders 50 include housing 49, having two bores 53 and 54 disposed in parallel spaced relation with respect to each other and the longitudinal axis of housing 49. Bores 53 and 54 are blind bores having closed ends 53a and 54a, respectively, and open ends 53b and 54b, respectively.

Referring to all the figures the brake system of the present invention operates as follows: Pedal 2 actuated mechanically pedal master cylinder 1 with pressure, said master cylinder 1 being provided with brake fluid by brake fluid reservoir 3. Via brake fluid lines D and E, the chambers of control valve 4 (FIG. 2), on the one hand, and chambers 72 and 73 of intermediate master cylinders 50 (FIG. 4), on the other hand, are supplied with brake fluid medium under pressure. The pressure of the brake fluid is supplied to the consumers, or the two brake circuits 10 and 12, respectively, through the open valve of the valve pistons 59 and 60. On reaching the reaction pressure of control valve 4, pistons 14 and 15 illustrated in FIG. 2 mechanically actuate valve 16. Atmospheric air flows into line B. The pressure in line B increasing in proportion with the hydraulic pressure at pistons 14 and 15 displaces vacuum piston 19 of vacuum brake booster 6 in the direction of booster cylinder 8 as shown in FIG. 3. In booster cylinder 8, vacuum piston 19 produces a servo pressure which moves the two secondary pistons 61 and 62 (FIG. 4) and their associated valve locking members 63 and 64, respectively, in the direction of valve pistons 59 and 60 until the valves (valve piston - valve locking member) are locked. Now valve pistons 59 and 60 are acted upon not only by the hydraulic pressure of pedal master cylinder 1, but also by the force of the valve locking members 63 and 64 controlled by said pressure through the means of booster 6 and booster cylinder 8.

Figure 2:
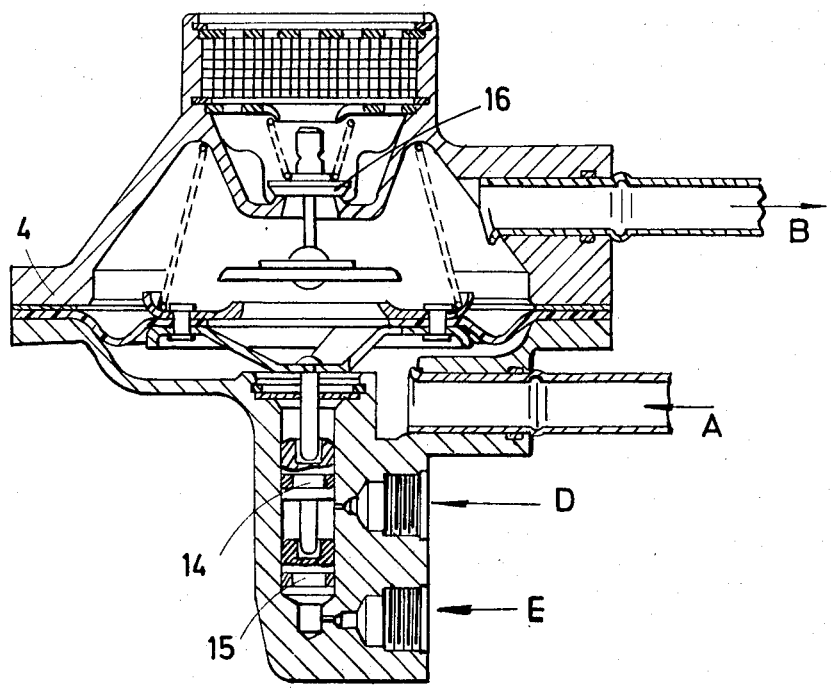
FIG. 2 is a cross-sectional view of the control valve of FIG. 1.

Control valve 4 illustrated in FIG. 2 is actuated by pressure of the brake fluid via the two brake fluid lines D and E. In the vacuum line A there exists a vacuum originating from vacuum chamber 18 of brake booster 6 (FIG. 3). Said vacuum line does not close until control valve 4 is actuated and at the same time air is flowing into line B via valve 16 (FIG. 2). The lines A and B are connected with the corresponding chambers of brake booster 6.

Brake booster 6 illustrated in FIG. 3 consists essentially, as known, of a vacuum chamber 18 and of a high-pressure chamber 17. Booster cylinder 8 is formed as an integral part of said brake booster. By means of the connecting line C a vacuum is generated which is provided by the vacuum manifold of the vehicle engine. The connecting lines A and B lead to control valve 4 as already described. Via pressure fluid reservoir 9 (FIG. 1), brake fluid line 20 leads to intermediate master cylinders 50 and more particularly into chambers 55 and 57 (FIG. 4) formed by the separating walls or members 65 and 66, secondary cylinders 67 and 68 and secondary pistons 61 and 62. Brake fluid line 20 serves only for pumping brake fluid to and fro.

In FIG. 4 intermediate master cylinders 50 are illustrated. They consist of the chambers 55 and 56 and chambers 57 and 58, respectively. Pressure chambers 56 and 58 are connected with the consumer or brake circuits 10 and 12 through ports 51 and 52 and contain therein valve pistons 59 and 60, respectively. Pistons 59 and 60 are axially or longitudinally displaceable. Valve piston 59 and 60 are pressed by springs 77 and 78 against separating walls 65 and 66, respectively. Springs 77 and 78 are supported against the closed ends 54a and 53a of bores 54 and 53 via cylindrical abutments 71 and 70, respectively. With regards to valve pistons 59 and 60, springs 77 and 78 are supported via collar seals 60a and 59a. Valve pistons 59 and 60 are displaced hydraulically by pedal master cylinder 1 via feeder lines D and E, on the one hand, and are displaced mechanically via valve locking members 63 and 64 of secondary pistons 61 and 62, on the other hand. Valve locking members 63 and 64 pass through walls 65 and 66 separating the two chambers 55 and 56; 57 and 58 of the intermediate master cylinders. Valve locking members 63 and 64 are rigidly connected to secondary pistons 61 and 62. Secondary pistons 61 and 62 are held and guided in the secondary cylinders or cylindrical members 67 and 68 screwed or threaded into the open ends 53b and 54b of bores 53 and 54, respectively, such as at 81. Upon failure of one of the two brake circuits secondary pistsons 61 and 62 are supported on the abutting surfaces of separating walls 66 and 65, respectively. By means of springs 76 and 90 supported by separating walls 65 and 66, secondary pistons 61 and 62 are pressed against the inner surface of secondary cylinders 67 and 68 adjacent open end 53b and 54b.

Secondary pistons 61 and 62 are actuated by brake booster 6 via feeder lines 74 and 75. The brake or pressure-fluid media in chambers 55 and 57 are in communication with the non-pressurized chamber of booster cylinder 8 via connection line 20 and with each other via intermediate ducts 69. Upon actuation of brake booster 6, secondary pistons 61 and 62 together with valve locking members 63 and 64 are pressed against valve bores 79 and 80 of valve pistons 59 and 60, such that there exists a mechanical connection between the two pistons. Now, the force of the brake booster is transmitted onto the consumer brake circuit. On reduction of the pedal pressure, the pressure previously built up in the consumer circuit and the springs 77 and 78 and/or the springs 76 and 90 push the pistons back into their starting positions.

While I have described above the principles of my invention in connection with specific apparatus it is to be more clearly understood that this description is made only by way of example and not as a limitation to the scope of my invention as set forth in the objects thereof and in the accompanying claims.

I claim:

1. A multi-circuit brake system comprising:
a pedal master cylinder having at least two outputs capable of supplying brake fluid to at least two brake fluid lines;
a vacuum brake booster;
a single control valve connected to each of said two lines adjacent said outputs of said pedal master cylinder and to said booster in a control relationship therewith;
a booster cylinder connected in operative relationship with said booster, said booster cylinder having a single brake fluid output;
at least two intermediate master cylinders, each of said intermediate master cylinders being connected in common with said single output of said booster cylinder and to a different one of said two lines adjacent said outputs of said pedal master cylinder, both of said intermediate master cylinders being subjected to brake fluid pressure from said pedal master cylinder and said booster cylinder when said brake booster is operative and being subjected to brake fluid pressure from only said pedal master cylinder when said brake booster is inoperative; and
at least two brake circuits each connected to and under control of a different one of said intermediate master cylinders.

2. A system according to claim 1, further including a brake fluid reservoir connected to said pedal master cylinder.

3. A system according to claim 1, further including a brake fluid reservoir connected in common to both said intermediate master cylinders and said booster cylinder.

4. A system according to claim 1, further including a first brake fluid reservoir connected to said pedal master cylinder; and
a second brake fluid reservoir connected in common to both said intermediate master cylinders and said booster cylinder.

5. A system according to claim 1, wherein
said two intermediate master cylinders include
a housing having a longitudinal axis,
two bores in said housing disposed in spaced parallel relationship to each other and said longitudinal axis, each of said bores having an open end connected to said booster cylinder and a closed end,
a valve piston disposed in each of said bores and displaceable longitudinally thereon,
a spring engaging each of said valve pistons and said closed end of the associated one of said bores,
a secondary piston having a locking member disposed in each of said bores and displaceable longitudinally therein, each of said locking members extending from one surface of the associated one of said secondary piston toward the associated one of said valve pistons, each of said locking members having an end engaging the associated one of said valve pistons for movement thereof when said brake booster is operative, the other surface of each of said secondary pistons being disposed adjacent said open end of the associated one of said bores, and
a member disposed transversely of each of said bores to slidably receive the associated one of said locking members and cooperating to form two chambers in series relation with respect to each other in the associated one of said bores, each of said chambers being filled with brake fluid, the first of said chambers in each of said bores is formed by said closed end of the associated one of said bores and the associated one of said members and is connected to a different one of said brake circuits and a different one of said brake fluid lines and contains the associated one of said valve pistons, the second of said chambers in each of said bores is formed by the associated one of said members and said secondary piston, each of said valve pistons being hydraulically displaced by means of said pedal master cylinder and being mechanically displaced by the associated one of said locking members when said brake booster is operative.

6. A system according to claim 5, wherein said second chamber of one of said bores is connected to be in communication with a non-pressurized portion of said booster cylinder and a brake fluid reservoir, and said second chamber of the other of said bores is connected to said second chamber of said one of said bores by a transverse duct in said housing.

7. A system according to claim 6, wherein each of said bores are stepped to provide said bore with a larger diameter in said second chamber than the diameter in said first chamber.

8. A system according to claim 7, wherein the effective surfaces of each of said valve pistons and each of said secondary pistons are different in size.

9. A system according to claim 8, wherein said open end of each of said bores is threaded, each of said second chambers are defined by a cylindrical member carrying the associated one of said secondary pistons, and each of said cylindrical members have their external surface threaded to enable each of said cylindrical members to be threaded into said open end of the associated one of said bores.

10. A system according to claim 5, wherein said open end of each of bores is threaded, each of said second chambers are defined by a cylindrical member carrying the associated one of said secondary pistons, and each of said cylindrical members have their external surface threaded to enable each of said cylindrical members to be threaded into said open end of the associated one of said bores.

* * * * *